United States Patent
Dalton et al.

(10) Patent No.: US 7,219,341 B2
(45) Date of Patent: May 15, 2007

(54) CODE ANALYSIS FOR SELECTIVE RUNTIME DATA PROCESSING

(75) Inventors: Ann Eleanor Dalton, Hants (GB); David Granshaw, Hants (GB); Matt Richard Hogstrom, Cary, NC (US); Aaron Stephen Jay Kershenbaum, New City, NY (US); Lawrence Koved, Pleasantville, NY (US); Bert Laonipon, Raleigh, NC (US); Simon Christopher Nash, Hampshire (GB); Marco Pistola, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 10/285,007

(22) Filed: Oct. 31, 2002

(65) Prior Publication Data

US 2004/0088687 A1 May 6, 2004

(51) Int. Cl.
*G06F 9/45* (2006.01)
(52) U.S. Cl. .................. 717/154; 717/151; 717/155
(58) Field of Classification Search ........ 717/141–144, 717/146–148, 151–159; 707/5; 718/104
See application file for complete search history.

(56) References Cited

U.S. PATENT DOCUMENTS

| | | | | |
|---|---|---|---|---|
| 6,412,108 B1 * | 6/2002 | Blandy et al. | ............... | 717/152 |
| 6,481,007 B1 * | 11/2002 | Iyer et al. | ................... | 717/151 |
| 6,532,491 B1 * | 3/2003 | Lakis et al. | .................. | 709/223 |
| 6,662,362 B1 * | 12/2003 | Arora et al. | ................. | 717/154 |
| 6,701,520 B1 * | 3/2004 | Santosuosso et al. | ....... | 717/152 |
| 6,721,945 B1 * | 4/2004 | Sinha | .......................... | 717/157 |
| 6,865,730 B1 * | 3/2005 | Burke et al. | ................. | 717/116 |

FOREIGN PATENT DOCUMENTS

WO    WO 9802809    1/1998

(Continued)

OTHER PUBLICATIONS

Aho, Sethi, Ullman "Compilers Principles, Techniques, and Tools", 1988, Addison-Wesley, ch. 7.5 and 10.5.*

(Continued)

*Primary Examiner*—Meng-Al T. An
*Assistant Examiner*—Jason Mitchell
(74) *Attorney, Agent, or Firm*—A. Bruce Clay, Esq.; Steven M. Greenberg, Esq.

(57) ABSTRACT

A method, system and apparatus for performing selective data processing based upon a static analysis of the code of a compiled object. A compiled object, for example an enterprise bean, can be analyzed to determine how individual methods in the enterprise bean access specific objects. Those specific objects can include, for instance, data members of a class, or class objects passed into one or more individual methods of the enterprise bean. Where the individual methods of the enterprise bean do not mutate or otherwise change the state of the specific objects, those objects can be accessed by reference only. Importantly, where the specific objects are data fields linked to a table in a database as managed by a container managed persistence (CMP) bean, an update to the table will not be required when the static analysis of the enterprise bean otherwise indicates that the data fields are merely accessed, but not updated.

14 Claims, 3 Drawing Sheets

FOREIGN PATENT DOCUMENTS

| | | |
|---|---|---|
| WO | 11-14937.4 | 6/1999 |
| WO | 2000-99380 | 4/2000 |

OTHER PUBLICATIONS

Weblogic Server 7.0 "http://e-docs.bea.com/wls/docs70/programming/classloading.html", posted Aug. 2002, downloaded Oct. 2005.*

Enterprise JavaBeans 1.0 "http://java.sun.com/products/ejb", posted Jan. 1999, downloaded Oct. 2005.*

"Aivosto's Visual Basic tips", "http://www.aivosto.com/vbtips.html", posted Aug. 2001, downloaded Oct. 2005.*

T. Janaudy,.*Accelerate EJB .0 development with EJBGen, Java World*, pp. 1-12, (Feb. 2002).

M. Dahm, *Byte Code Engineering, Institut für Informatik FU Berlin*, <dahm@inf.fu-berlin.de p. 2>, (Sep. 21, 1999).

M. Dahm, *Byte Code Engineering with the BCEL API. Technical Report B-17-98, Freie Universit at Berlin, Institut f ur Informatik*, (Apr. 3, 2001).

M. Day, et al., *References to Remote Mobile Objects in Thor, ACM Letters on Programming Languages and Systems*, pp. 115-126, vol. 2, Nos. 1-4, (Mar.-Dec. 1993).

M. Hicks, et al., *Transparent Communication for Distributed Objects in Java, ACM Java Grande Conference*, pp. 160-170, (Jun. 1999).

*Session sharing in a cluster of Java servers, in IBM Research Disclosure*, at 355 (Feb. 2000).

* cited by examiner

CODE ANALYSIS FOR SELECTIVE RUNTIME DATA PROCESSING

BACKGROUND OF THE INVENTION

1. Statement of the Technical Field

The present invention relates to code analysis, and more particularly to performing selective data processing based upon a static analysis of code.

2. Description of the Related Art

Introduction

The modern programming language has evolved from little more than a listing of machine instructions which can be executed natively by a central processing unit, to a source code listing which can be compiled into native machine code. Intermediately, interpretable code, such as the BASIC computer language have provided the ability for an interpreter to parse and execute source code inline at run-time. Recently, programming languages have begun to conform to a new paradigm in which source code can be compiled into platform-independent byte code which subsequently can be executed by a run-time virtual machine.

The Java™ and C#™ programming languages and environments represent two such byte-code oriented programming languages. In the Java programming language, as in the case of the C# programming language, programs can be compiled into class objects consisting mainly of byte code. In the Java programming environment, a Java Virtual Machine™ (JVM) can interpret the byte code at run-time and can produce, as a result, machine code which can be executed by a host computing platform. Significantly, byte code can be serialized so as to enable the remote invocation and execution of compiled objects. Thus, byte code type programming languages represent the cutting edge of network enabled, distributed computer processing.

Byte-Code Analysis

Inasmuch as byte code can be interpreted by a virtual machine or some other such byte code processor, byte code can be analyzed not only post-compilation, but also pre-execution. That is to say, while traditional computer scientists have analyzed the likely operation of a computer program prior to compile time based upon the content of human readable source code, byte code analysis techniques have incorporated the static analysis of byte-code produced from human readable source code in order to achieve several objectives. Principal among those objectives, byte code analysis techniques can provide a method of predicting the behavior of a compiled object even when access to source code does not exist.

As a specific example, byte code analysis techniques have been used to optimize the execution of a compiled object. Similarly, byte code analysis techniques have been used to modify the behavior of a compiled object. Finally, byte code analysis techniques have been applied to compiled objects where the original source code associated with the compiled object no longer can be accessed. In all cases, to assist in the static analysis of byte code, several tools have been developed which can produce a visualization of the execution of a compiled object based upon the byte code of the compiled object.

Notably, the principals of byte code analysis can be applied to other types of intermediate code. For instance, object analysis and design tools have been configured to analyze the functionality and operational characteristics of both source code and object code. In particular, object code can be statically analyzed in a number of intermediate states, not only including byte code, but also including code of other intermediate states, such as the GNU gcc intermediate representation. In all cases, the code can be statically parsed to analyze the possible execution paths of the underlying logic of the code.

Entity Beans

While the Java programming language initially had been developed to support the notion of "write once, run anywhere" computing, the serialized nature in combination with the platform independence of Java objects can support enterprise computing efforts. To that end, Enterprise Java Bean™ (EJB) technologies have expanded upon the base Java programming language to provide an architecture for a transactional, distributed object system based on components. More particularly, the EJB 1.1 specification defines an architecture for the development and deployment of transactional, distributed object applications-based, server-side software components. These server-side components, referred to as enterprise beans, are distributed objects that are hosted in EJB containers and provide remote services for clients distributed throughout the network.

To create an EJB server-side component, an enterprise bean developer provides two interfaces that define a bean's business methods, in addition to the actual bean implementation class. The client then can use the bean's public interfaces to create, manipulate, and remove beans from the EJB server. The implementation class, referred to typically as the "bean class", can be instantiated at runtime and can become a distributed object.

Enterprise beans "live" in an EJB container and can be accessed by client applications over the network through their remote and local interfaces. The remote and local interfaces expose the capabilities of the bean and provide each of the methods required to create, update, interact with, and delete the bean. There are two basic types of enterprise beans: entity beans, which represent data in a database, and session beans, which represent processes or act as agents performing tasks. The entity bean provides an object-oriented interface to data that would normally be accessed by a database connectivity application programming interface (API). Additionally, entity beans provide a component model that allows bean developers to focus their attention on the business logic of the bean, while the container manages persistence, transactions, and access control.

Passing Objects to an EJB

The EJB specification provides for the concept of a remote interface on an EJB in order both to abstract access to an EJB implementation, and also to make access to the EJB implementation highly portable. In that regard, to protect the caller of an EJB from the modification of the EJB by the caller, the EJB specification requires that objects passed to an EJB are to be passed by value rather than reference. This requirement is intended to preserve local/remote transparency in the EJB model. Yet, making a copy of an object is an expensive operation and, depending upon the application and use by the bean of non-primitive Java type, object copying can have a significant overall impact on performance.

Container Managed Persistence Beans

There are two types of entity beans: Container-Managed Persistence (CMP), and Bean-Managed Persistence (BMP). With a CMP bean, the container manages the persistence of the entity bean. Vendor tools are used to map the entity fields to the database and database access code need not be included in the bean class. In the case of a BMP bean, by comparison, the entity bean contains database access code and is responsible for reading and writing its own state to the database. Furthermore in the case of a BMP bean, the container can handle any locking or transactions, so that the database can maintain its integrity.

CMP beans often are viewed as the simplest bean for the bean developer to create, yet the most difficult for the EJB server to support. This is so because all of the logic for synchronizing the bean's state with the database is handled automatically by the container. Consequently, the bean developer need not write data access logic for the bean as the EJB server purportedly handles all of the persistence needs of the bean automatically. Still, while most EJB implementations support automatic persistence to a relational database, the level of support can vary. Some EJB implementations can provide very sophisticated Object-to-Relational mapping, while others are very limited.

In the typical implementation, a CMP entity bean can defer all interaction with an underlying database to an EJB container. The CMP entity bean, in turn, can expose a set of methods that permit the data in the database to be referenced or updated by other application processes. When the container reads the data from the database, the container can place the data into fields of the CMP entity bean. Subsequently, application processes can reference and update the data in the fields. At the conclusion of a transaction, the container can access the data in the CMP entity bean and can update the underlying row in the table of the database.

Notably, the CMP entity bean style of mapping a relational database to an object can provide a significant benefit as access to the data in the database can be greatly simplified and can be used by a number of application processes. Notwithstanding, the conventionally known CMP entity bean style also can prove deficient in terms of efficiency and performance. Specifically, in a simple model, all data in the CMP entity bean, whether updated or otherwise, will result in the container writing the data back to the database. Where no modifications to the data have been performed in the CMP entity bean, an unnecessary write will occur in the database at the conclusion of the transaction.

Notably, writing to a relational database can be an expensive operation. At the minimum, storing data that has only been referenced, but not modified, can result in the execution of a time-consuming database write operation yielding no end-user benefit. Furthermore, in addition to the execution of a structured query language (SQL) statement to update the table in the database, often it is necessary to upgrade a lock from a read-only state to an exclusive state. At best, the upgrade can increase response time. In the worst case scenario, however, the upgrade can result in a deadlock resulting from lock promotion.

SUMMARY OF THE INVENTION

The present invention is a method, system and apparatus which addresses the deficiencies of the prior art and provides a novel and non-obvious method for performing selective data processing based upon a static analysis of the code. For example, in one aspect of the invention, a compiled object, for example an enterprise bean, can be analyzed to determine how individual methods in the enterprise bean access specific objects. Those specific objects can include, for instance, data members of a class, or class objects passed into one or more individual methods of the enterprise bean.

Where the individual methods of the enterprise bean do not mutate or otherwise change the state of the specific objects, those objects can be accessed by reference only, rather than by value. Also, where the specific objects are data fields linked to a table in a database as managed by a CMP bean, an update to the table will not be required when the static analysis of the enterprise bean otherwise indicates that the data fields are merely accessed, but not updated. In either case, resource intensive pass by value operations or database table update operations can be avoided so long as the statically analyzed calling method is determined not to mutate or modify the object or data field, respectively.

Importantly, the static analysis can include a byte code analysis technique in which the methods of the object can be analyzed. Alternatively, the source code from which the bean can be produced can be analyzed. In either case, the analysis can be recorded in a log file which can be used subsequently by an external process to undertake selective run-time data processing. Alternatively, the byte code of the object itself can be modified to perform selective run-time data processing. Finally, the class for which the analyzed methods are members can be modified to perform the selective run-time data processing.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for performing selective data processing based upon a static analysis of code, for instance byte code in a compiled object. More specifically, in accordance with the inventive arrangements, a compiled object, for example an enterprise bean, can be analyzed to determine how individual methods in the enterprise bean access specific objects. Importantly, instead of analyzing a compiled object, the source code for the compiled object can be analyzed to determine how individual methods access specific objects.

Those specific objects can include, for instance, data members of a class, or class objects passed into one or more individual methods of the enterprise bean. Where the individual methods of the enterprise bean do not mutate or otherwise change the state of the specific objects, those objects can be accessed by reference only. Importantly, where the specific objects are data fields linked to a table in a database as managed by a CMP bean, an update to the table will not be required when the static analysis of the enterprise bean otherwise indicates that the data fields are merely accessed, but not updated.

Figure 1:
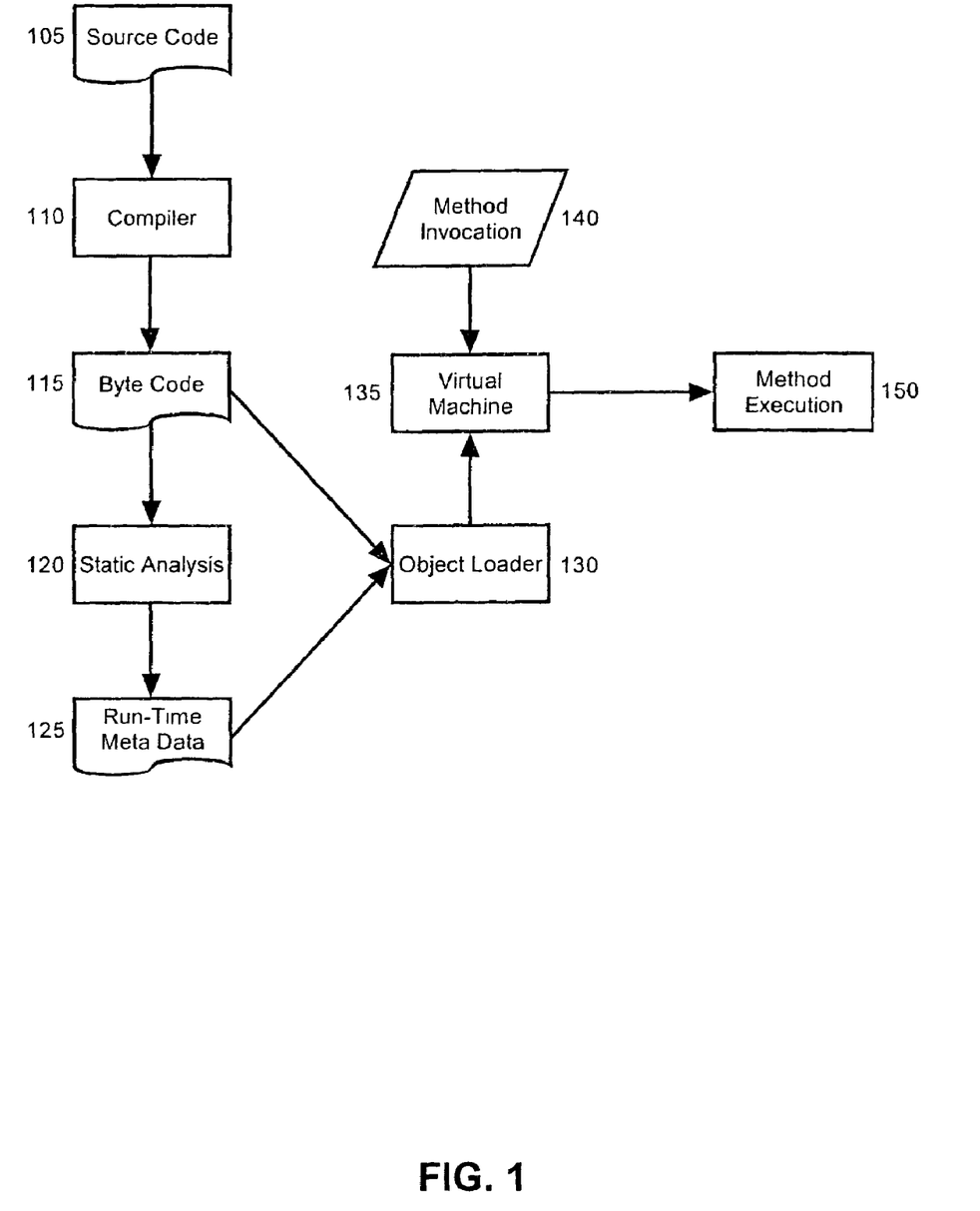
FIG. 1 is a block illustration of a process for selectively configuring an object for a particular run-time behavior based upon a static analysis of the byte code of the object in accordance with a preferred aspect of the present invention.

FIG. 1 is a block illustration of a process for selectively configuring an object for a particular run-time behavior based upon a static analysis of the byte code of the object. Specifically, source code 105 can be processed in compiler 110 to produce byte code 115. The byte code 115 subsequently can be subjected to a static analysis 120, so as to determine the run-time behavior of the object. In particular, the static analysis 120 can identify methods in the object which possibly mutate or otherwise modify passed objects or data accessed by the method. The results of the analysis can be written to a log 125.

At run-time, an object loader 130 associated with a virtual machine 135 can load the byte code 115 in addition to the log 125. Using the log 125, upon method invocation 140, the virtual machine 135 can selectively manage the execution 150 of the invoked method. For instance, where an object is to be accessed by the method invoked method, the virtual machine 135 can consult the log 125 to determine whether the method will mutate the object. If the method will mutate the object according to the log 125, the virtual machine 135 can pass the object into the method by value in order to preserve remote/local transparency as required by the EJB 1.1 specification. Otherwise, the virtual machine 135 can pass the object into the method by reference only so as to enjoy enhanced computational efficiencies associated with passing-by-reference.

Similarly, where the object to be accessed by the method is a data field linked to a table in a database and managed by a CMP bean, it can be determined whether the method will modify the data field, or whether the method will merely access the data field without updating the same. To that end, the CMP bean can consult the log 125 to determine whether the method will modify the data field thereby requiring an update to the underlying table. If the method will modify the data field according to the log 125, the CMP bean can permit a table update as would be the case conventionally. Otherwise, the CMP bean can withhold the table update so as to avoid the consumption of resources associated with table updates.

Figure 2:
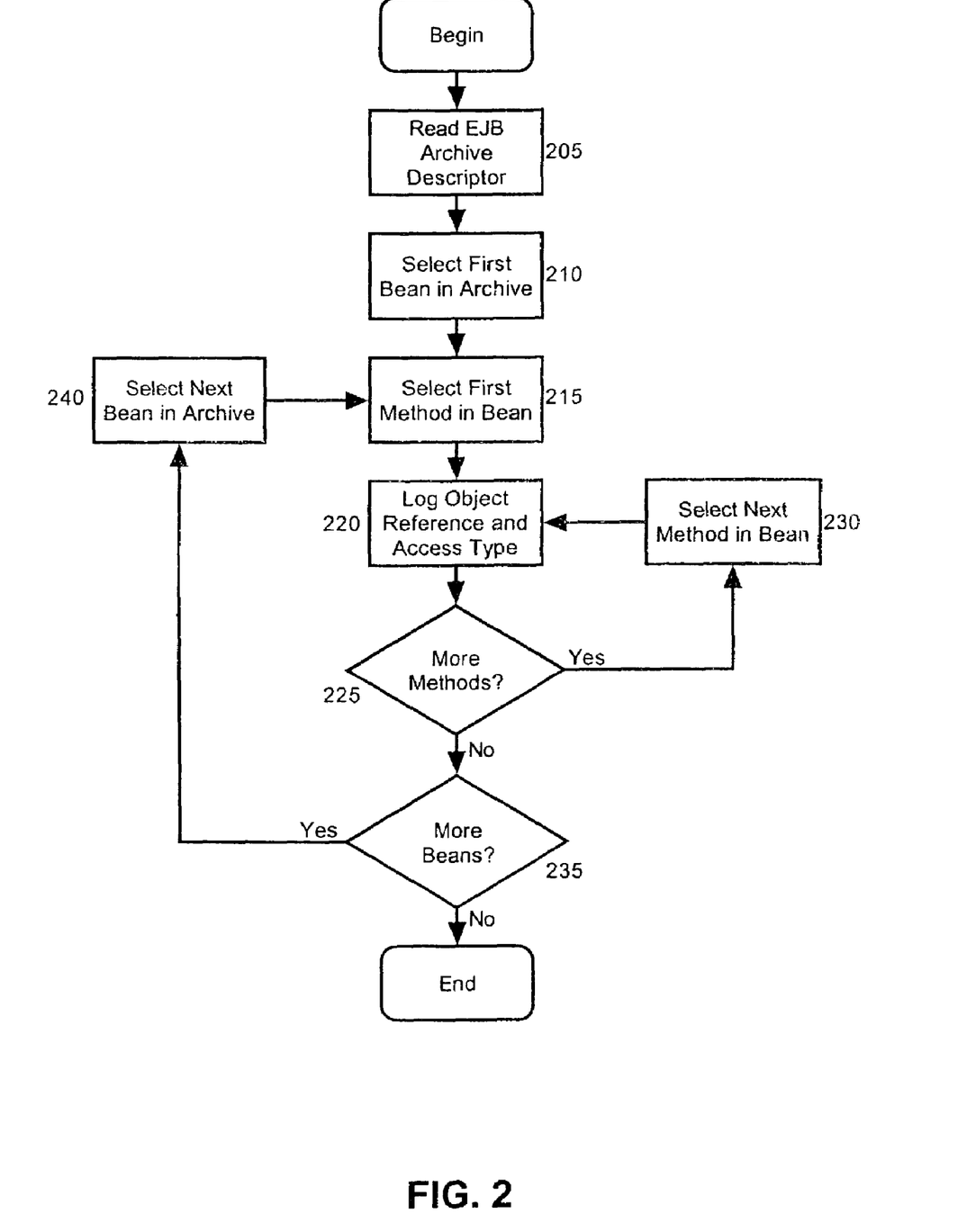
FIG. 2 is a flow chart illustrating a process for selectively configuring the passing of an object to an EJB by value or by reference based upon a static analysis of the byte code of the bean.

FIG. 2 is a flow chart illustrating a process for selectively configuring the passing of an object to an EJB by value or by reference based upon a static analysis of the byte code of the bean. Beginning in block 205, a descriptor for the EJB can be loaded into the static analysis tool. The descriptor can include, for instance, the ejb-jar.xml file commonly known by those skilled in the art which have some familiarity with the WebSphere™ Application Server manufactured by International Business Machines Corporation of Armonk, N.Y. Still, the invention is not limited merely to the analysis of Java compiled objects in an application server and other such application servers able to process objects compiled from source code developed using other programming languages such as C# can suffice.

In block, 210, the first bean specified in the archive can be selected, and in block 215, the first method of the local/remote interfaces referenced within the specified bean can be selected. In block 220, a byte code analysis of object reference and access type within the selected method can be undertaken with the results being written to a log. In decision block 225, if more methods remain to be analyzed, in block 230 the next method of the local/remote interfaces can be selected and the process of blocks 220 through 230 can repeat. Otherwise, in decision block 235 it can be determined whether additional beans remain to be analyzed, and if so, in block 240 the next bean in referenced in the archive can be selected. Subsequently, the process of blocks 215 through 240 can repeat. Otherwise, the static analysis can end, the analysis having produced a log of object types and access types for each method included in the beans specified by the archive.

Importantly, at run-time, as the beans specified by the descriptor are loaded and initialized, the log can be loaded as well. Subsequently, the log can provide a runtime reference for method invocations. More particularly, as each method is invoked, objects which are to be passed to the method can be passed by reference or by value depending upon the contents of the log. Where the log indicates that the method will mutate the object, the object can be passed by value so as to preserve local/remote transparency. Otherwise, where the log indicates that the object is immutable in respect to the invoked method, the object can be passed by reference.

Notably, the present invention is not limited strictly to the production of a log subsequent to the static analysis of the compiled object. Additionally, the invention is not strictly limited to the static analysis of a compiled object. Rather, in other preferred aspects of the present invention, a static analysis of source code be performed in which methods which mutate a passed object can be identified. Instead of writing an entry to a log file, however, the object itself can be modified to produce the selected run-time behavior based upon the analysis. In that regard, either the source can be modified and the object re-compiled, or the byte code of the object itself can be modified. Finally, the class to which the mutated method belongs similarly can be modified to cause the selected run-time behavior based upon whether the method mutates the passed object.

Figure 3A:
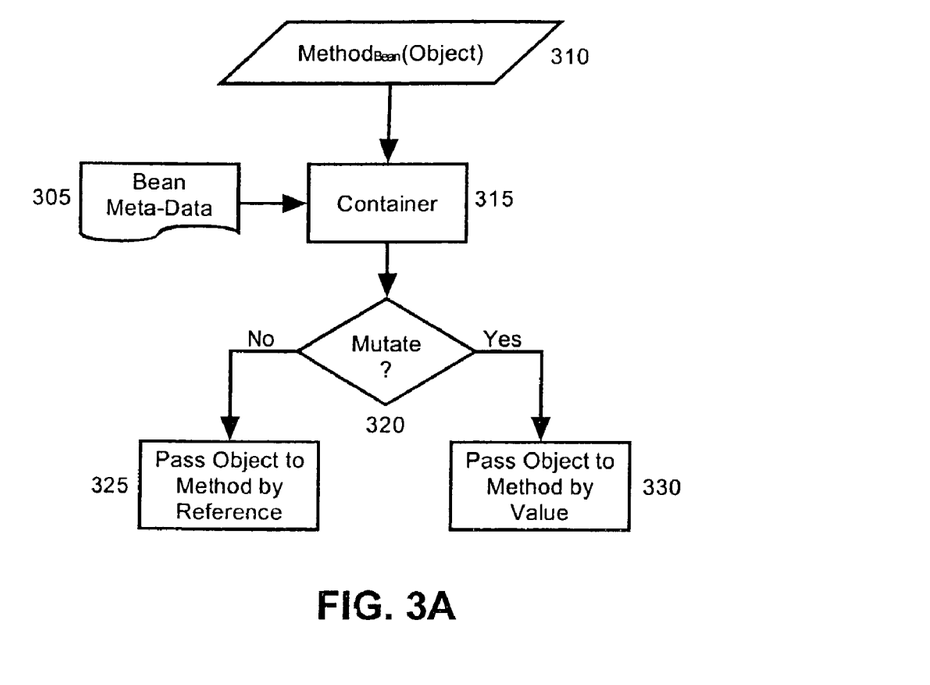
FIG. 3A is a block diagram illustrating a method for selectively passing an object to a bean by reference, or by value based upon meta-data produced by a static analysis of the bean; and, FIG. 3B is a block diagram illustrating a method for selectively managing access to data in a database based upon meta-data produced by a static analysis of the byte code of a CMP bean.

FIG. 3A is a block diagram illustrating a method for selectively passing an object to a bean by reference, or by value based upon meta-data produced by a static analysis of the bean. In particular, a bean container 315 can reference bean meta-data 305 when responding to the invocation of a method 310 of the bean in which an object can be accessed by the method 310. Based upon the bean meta-data 305, the container 315 can determine in decision block 320 whether the method 310 can mutate the object. If the method 310 can mutate the object according to the bean meta-data 305, the container can pass the object to the method 310 by value in block 330. Otherwise, in block 325 the container can pass the object to the method 310 by reference.

The technology of the present invention also can be applied CMP bean structures. In that regard, during the static analysis of a CMP bean, methods of the CMP bean and any classes which are referenced by the CMP bean are loaded and it can be determined which methods and classes access fields defined as container managed for the CMP bean. Subsequently, meta-data for the CMP can be logged in relation to the determination of the static analysis. For instance, flags for indicating whether a method has an access intent of "read" or "update" can be set appropriately in the application server. Accordingly, the manual error often associated with the manual analysis of a CMP bean and the resulting improper setting of the flags can be avoided.

Figure 3B:
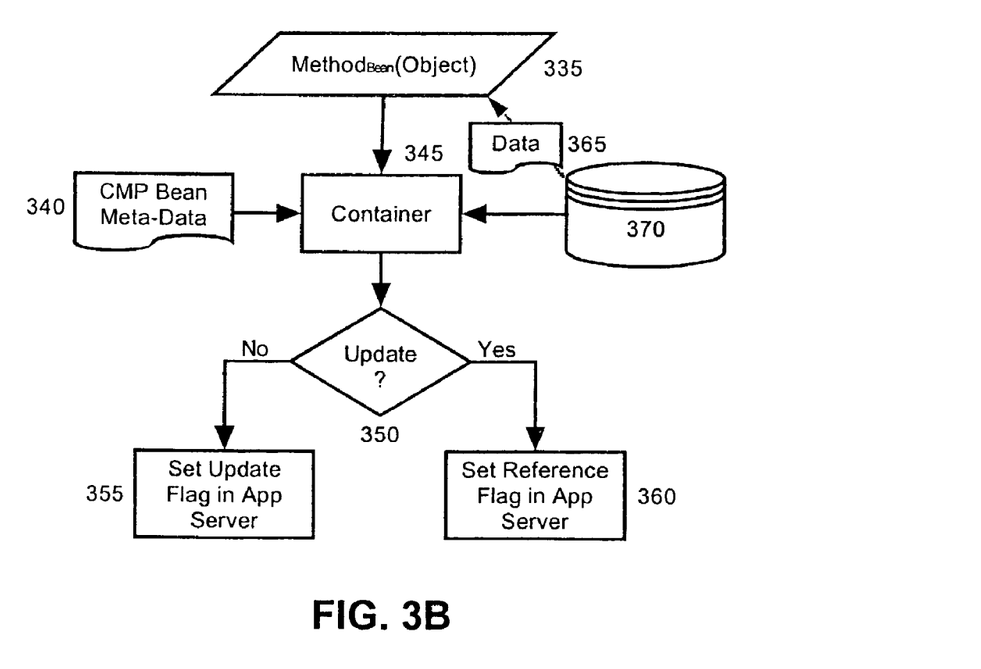

FIG. 3B is a block diagram illustrating a method for selectively managing access to data in a database based upon meta-data produced by a static analysis of the byte code of a CMP bean. Referring to FIG. 3B, a bean container 345 can reference CMP bean meta-data 340 when responding to the invocation of a method 335 of the bean in which data 365 in a database 370 can be accessed by the method 335. Based upon the CMP bean meta-data 340, the container 345 can determine in decision block 350 whether the method 335 can modify the data 365. If the method 335 can modify the data 365, according to the bean meta-data 340, in block 355 the container can update the database 370 at the conclusion of the processing of the method 335. Otherwise, in block 360 the container can bypass updating the database 370 at the conclusion of the processing of the method 335.

Significantly, one skilled in the art will recognize the inherent efficiencies of the present invention. In particular, as applied to CMP beans, updates to database tables can be avoided in those instances where a method of a bean does not require "update" type access to data in a database as managed by the CMP bean. Similarly, as applied to the accessing of an object within a method of an EJB, the object need not by inefficiently passed by value in those circumstances where the method of the EJB merely requires "read" access and where the EJB method will not mutate the object. Accordingly, the application of the present invention can provide enhanced efficiencies over conventionally known byte code analysis methods of the prior art.

The present invention can be realized in hardware, software or firmware, in a centralized fashion in one computer system, or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, controls the computer system such that it carries out the methods described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of selectively executing a method based upon a static analysis of a plurality of methods defined in code, said method comprising the steps of:
   determining from the static analysis individual ones of the methods which modify at least one object accessed by the method; and,
   for each method invoked, responsive to said invocation of said method, providing access to said at least one object in said invoked method by reference where in said determining step it is determined that said invoked method does not modify said at least one object when accessing said at least one object, and
   providing access to said at least one object by value where in said determining step it is determined that said invoked method modifies said at least one object when accessing said at least one object.

2. The method of claim 1, wherein said providing access to said one object comprises the step of providing update access to said at least one object in said invoked method where in said determining step it is determined that said invoked method modifies said at least one object when accessing said at least one object.

3. The method of claim 2, wherein said object is data in a data field configured for management by a container managed persistence (CMP) bean.

4. A selective run-time behavior modification method comprising the steps of:
   performing a static analysis of code associated with a compiled object comprising a plurality of methods, said static analysis producing a log of objects accessed by said methods and corresponding access types; and,
   responsive to an attempt to invoke one of said methods with respect of a particular object, consulting said log to determine whether said invoked method modifies said particular object, and if it is determined from said log that said invoked method does not modify said particular object, passing a reference to said particular object to said invoked method and otherwise passing a copy of said particular object to said invoked method.

5. A selective run-time behavior modification method comprising the steps of:
   performing a static analysis of byte code of a compiled object comprising a plurality of methods which are configured to access data in a database table through a container managed persistence (CMP) bean, said static analysis producing a log of methods and corresponding access types; and,
   responsive to an attempt to invoke one of said methods with respect to a particular data field, consulting said log to determine whether said invoked method updates said particular data field, and if it is determined from said log that said invoked method does not update said particular data field, foregoing in said CMP bean a database update operation upon a conclusion of processing in said invoked method and otherwise performing a database update operation in said CMP bean upon a conclusion of processing in said invoked method.

6. In an application server, a container managed persistence (CMP) bean processing method comprising the steps of:
   performing a static analysis of byte code of a compiled object comprising a plurality of methods which are configured to access data in a database table through a CMP bean, said static analysis producing a log of methods and corresponding access types;
   consulting said log to determine whether said logged methods update particular data field; and,
   for each method determined from said consulting step to update one of said particular data fields, setting a flag in the application server to indicate said CMP bean should forego a database update operation upon a conclusion of processing in invoked ones of said methods and otherwise setting the flap to indicate said CMP bean should perform a database update operation upon a conclusion of processing in said invoked method.

7. A machine readable storage having stored thereon a computer program for selectively executing a method based upon a static analysis of a plurality of methods defined in code, said computer program comprising a routine set of instructions which when executed by the machine cause the machine to perform the steps of:
   determining from the static analysis individual ones of the methods which modify at least one object accessed by the method; and,
   for each method invoked, responsive to said invocation of said method, providing access to said at least one object in said invoked method by reference where in said determining step it is determined that said invoked method does not modify said at least one object when accessing said at least one object, and providing access to said at least one object by value where in said determining step it is determined that said invoked method modifies said at least one object when accessing said at least one object.

8. The machine readable storage of claim 7, wherein said providing access to said at least one object by value further comprises the step of providing update access to said at least one object in said invoked method where in said determining step it is determined that said invoked method modifies said at least one object when accessing said at least one object.

9. The machine readable storage of claim 8, wherein said object is data in a data field configured for management by a container managed persistence (CMP) bean.

10. A machine readable storage having stored thereon a computer program for performing code analysis, the computer program comprising a routine set of instructions which when executed cause the machine to perform the steps of:
   performing a static analysis of byte code of a compiled object comprising a plurality of methods, said static analysis producing a log of objects accessed by said methods and corresponding access types; and,
   responsive to an attempt to invoke one of said methods with respect of a particular object, consulting said log to determine whether said invoked method modifies said particular object, and if it is determined from said log that said invoked method does not modify said particular object, passing a reference to said particular object to said invoked method and otherwise passing a copy of said particular object to said invoked method.

11. A machine readable storage having stored thereon a computer program for performing code analysis, the computer program comprising a routine set of instructions which when executed cause the machine to perform the steps of:
   performing a static analysis of byte code of a compiled object comprising a plurality of methods which are configured to access data in a database table through a container managed persistence (CMP) bean, said static analysis producing a log of methods and corresponding access types; and,
   responsive to an attempt to invoke one of said methods with respect to a particular data field, consulting said log to determine whether said invoked method updates said particular data field, and if it is determined from said log that said invoked method does not update said particular data field, foregoing in said CMP bean a database update operation upon a conclusion of processing in said invoked method and otherwise performing a database update operation in said CMP bean upon a conclusion of processing in said invoked method.

12. A machine readable storage having stored thereon a computer program for performing a container managed persistence (CMP) bean processing in concert with an application server, the computer program comprising a routine set of instructions which when executed cause the machine to perform the steps of:
   performing a static analysis of byte code of a compiled object comprising a plurality of methods which are configured to access data in a database table through a CMP bean, said static analysis producing a log of methods and corresponding access types;
   consulting said log to determine whether said logged methods update particular data fields; and,
   for each method determined from said log to update one of said particular data fields, setting a flag in the application server to indicate said CMP bean should forego a database update operation upon a conclusion of processing in invoked ones of said methods and otherwise setting the flag to indicate said CMP bean should perform a database update operation upon a conclusion of processing in said invoked method.

13. A code analysis and processing tool comprising:
   a static analyzer configured to statically analyze code of a bean to produce a log of methods in said bean, objects accessed by said methods, and access types corresponding to said accessed objects; and,
   object loading and initialization logic coupled to a virtual machine and configured to load and initialize said code so that said virtual machine passes to selected ones of said methods, by reference, accessed objects defined in said byte code where said selected ones of said methods are determined in said log of methods not to mutate said accessed objects, and otherwise to load and initialize said code so that said virtual machine passes to selected ones of said methods, by value, accessed objects defined in said byte code.

14. A code analysis and processing tool comprising:
   a static analyzer configured to statically analyze code of a bean to identify a set of methods in said bean, objects accessed by said methods, and access types corresponding to said accessed objects; and,
   object modification logic coupled to said static analyzer and configured to modify said code of said bean so that said virtual machine passes to selected ones of said methods, by reference, accessed objects defined in said code where said selected ones of said methods are determined by said static analyzer not to mutate said accessed objects and otherwise to produce said code of said bean so that said virtual machine passes to selected ones of said methods, by value, accessed objects efined in said code.

* * * * *

UNITED STATES PATENT AND TRADEMARK OFFICE
CERTIFICATE OF CORRECTION

PATENT NO. : 7,219,341 B2  Page 1 of 1
APPLICATION NO. : 10/285007
DATED : May 15, 2007
INVENTOR(S) : Ann Dalton et al.

It is certified that error appears in the above-identified patent and that said Letters Patent is hereby corrected as shown below:

On the title page item (75),
Please correct inventor Marco PISTOIA'S name from PISTOLA Marco to PISTOIA Marco.

Signed and Sealed this

Twenty-ninth Day of July, 2008

JON W. DUDAS
*Director of the United States Patent and Trademark Office*